9-17-74 OR 3,836,234

United States Patent [19]

Farnsworth

[11] 3,836,234

[45] Sept. 17, 1974

[54] FULLY CLOSING IRIS DIAPHRAGM

[75] Inventor: John Leonard Farnsworth, Leicester, England

[73] Assignee: The Rank Organisation Limited, London, England

[22] Filed: Mar. 12, 1973

[21] Appl. No.: 340,117

[30] Foreign Application Priority Data

May 17, 1972 Great Britain .................... 23096/72

[52] U.S. Cl. .................. 350/266, 250/229, 354/274

[51] Int. Cl. ........................... G02f 1/30, G03b 9/02

[58] Field of Search ..... 350/266; 250/229; 95/64 R; 354/274

[56] References Cited

UNITED STATES PATENTS

| | | | |
|---|---|---|---|
| 622,592 | 4/1899 | Berger | 95/64 R |
| 745,313 | 12/1903 | Bate | 95/64 R |
| 1,388,938 | 8/1921 | Enders | 95/64 R |
| 3,098,421 | 7/1963 | O'Hara | 95/64 R |
| 3,668,995 | 6/1972 | Bardutzky | 95/64 R |

*Primary Examiner*—Vincent P. McGraw
*Attorney, Agent, or Firm*—Brisebois & Kruger

[57] ABSTRACT

A fully-closing iris diaphragm is disclosed which consists of a substantially conventional iris diaphragm with the addition of a capping section to one leaf, which is positioned to obscure the minimum aperture obtainable without "scissoring" distortion of the leaves.

5 Claims, 5 Drawing Figures

FULLY CLOSING IRIS DIAPHRAGM

This invention relates to iris diaphragms as used in cameras and other optical equipment.

In some applications it is desirable to be able to close an optical path completely. This is desirable, for example, in a television camera to prevent light reaching the pickup tube when the camera is not in use. However the traditional iris diaphragm cannot be completely closed as it consists of a number of iris leaves which are interleaved. As the leaves are moved to progressively reduce the central aperture they are caused to distort from the flat condition since all the leaves cannot lie in the same plane. A point is reached at which the distortion (or "scissoring") becomes so severe that the iris cannot be closed further without damage to the leaves or operating mechanism. Thus in many cases a capping arrangement separate from the diaphragm must be used.

Several attempts have been made to provide a fully closing diaphragm.

In one proposal, the iris is conventional but an additional leaf is added and operated by a cam on the slot ring which is additional to the slots driving the conventional leaves. This "capping" leaf is caused to move in rapidly as the iris reaches the extreme end of the range and covers the central aperture left by the other leaves. The solution is not cheap and involves more complication and unreliability in the mechanism.

An object of the invention is therefore to provide a simple and reliable fully closing iris diaphragm.

Accordingly, the present invention provides an iris diaphragm including a support, a plurality of leaves pivotally mounted on the support, means for pivotting the leaves in unison into and out of an optical path between outer and inner positions, and a capping section on one leaf which, in the inner position of the leaves, covers the aperture formed by the leaves.

The capping section may be formed integrally with its associated leaf. Alternatively, it may be a separate element secured to its associated leaf, in which case it is preferably of the same thickness as the leaves.

Each leaf has its edge nearest the optical path curvilinearly formed in at least a first curve and a second curve, the first curve being an arc of a circle and defining with the first curves of the other leaves the maximum aperture as a circle, and the second curve having an opposite curvature to that of the first curve, the capping section being adjacent the end of said second curve distant from said first curve and projecting from said edge towards the optical path.

An embodiment of the present invention will now be described, by way of example, with reference to the accompanying drawings, in which.

Figure 1:
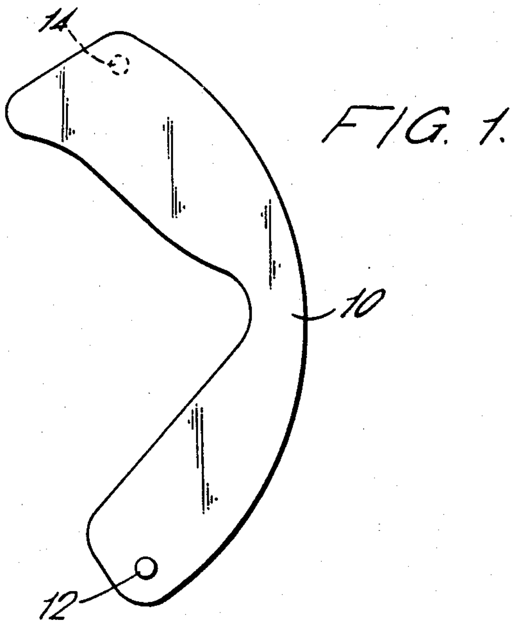
FIG. 1 shows a standard iris diaphragm leaf as used in known diaphragms.

Referring to FIG. 1, a conventional iris leaf 10 carries rivets 12 and 14 adjacent either end which project in opposite directions. The rivet 12 engages a bore in a supporting ring (not shown) thus mounting the leaf for pivotal movement about the rivet 12. The other rivet 14 engages a slot cut in a slot ring. Thus when a number (typically nine) such leaves are mounted between the support ring and the slot ring in an interleaved fashion, movement of the slot ring relative to the support ring alters the aperture by pivotting the leaves in unison.

Figure 2:
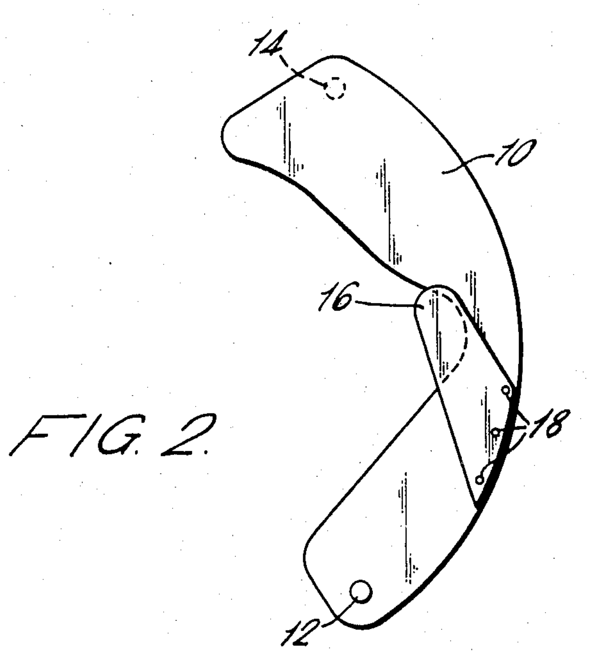
FIG. 2 shows a leaf like that of FIG. 1 with cut off section added.

FIG. 2 shows a leaf 10 as in FIG. 1 to which a triangular-shaped cut off section 16 has been mounted as by spot welds 18. The function of the cut off section 16 will become clear from the following description.

Figure 3:
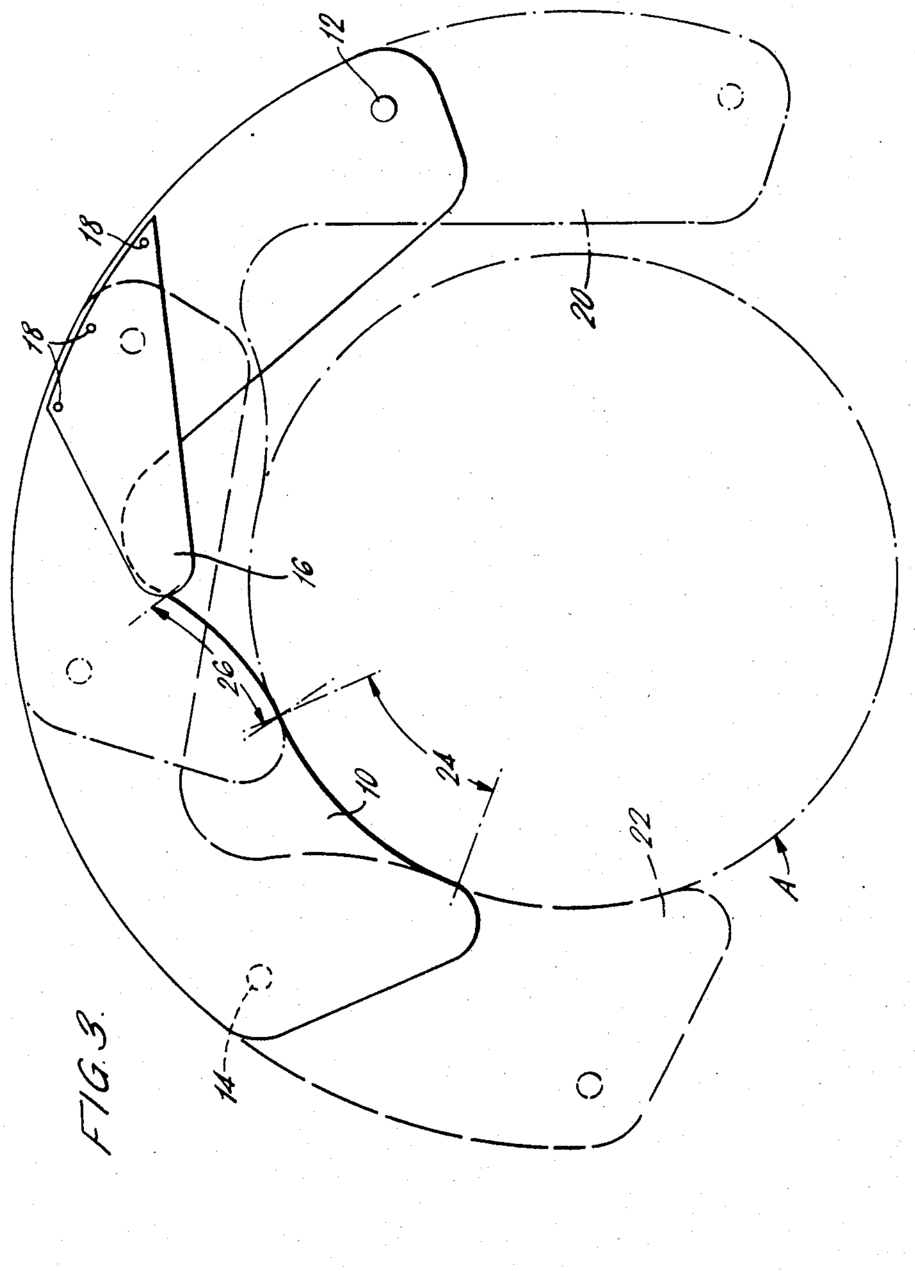
FIG. 3 illustrates on an enlarged scale a diaphragm in accordance with the invention in its maximum aperture position, FIG. 4 similarly illustrates the minimum aperture position.

Turning now to FIG. 3, the leaf 10 is shown in full outline, together with an adjacent leaf 20 below the leaf 10 shown chain-dotted, and another adjacent leaf 22 above the leaf 10 shown in dashed outline. The leaves 10, 20, 22 are shown in their outermost position defining a maximum aperture indicated by the circle A. As can be seen in the drawing the leaf 10, for example, has its aperture-defining edge formed by two curved portions, the first of which, referenced as portion 24, is an arc of a circle and defines with corresponding portions the maximum aperture, while the second portion 26 is of opposite curvature to define smaller apertures.

Figure 4:
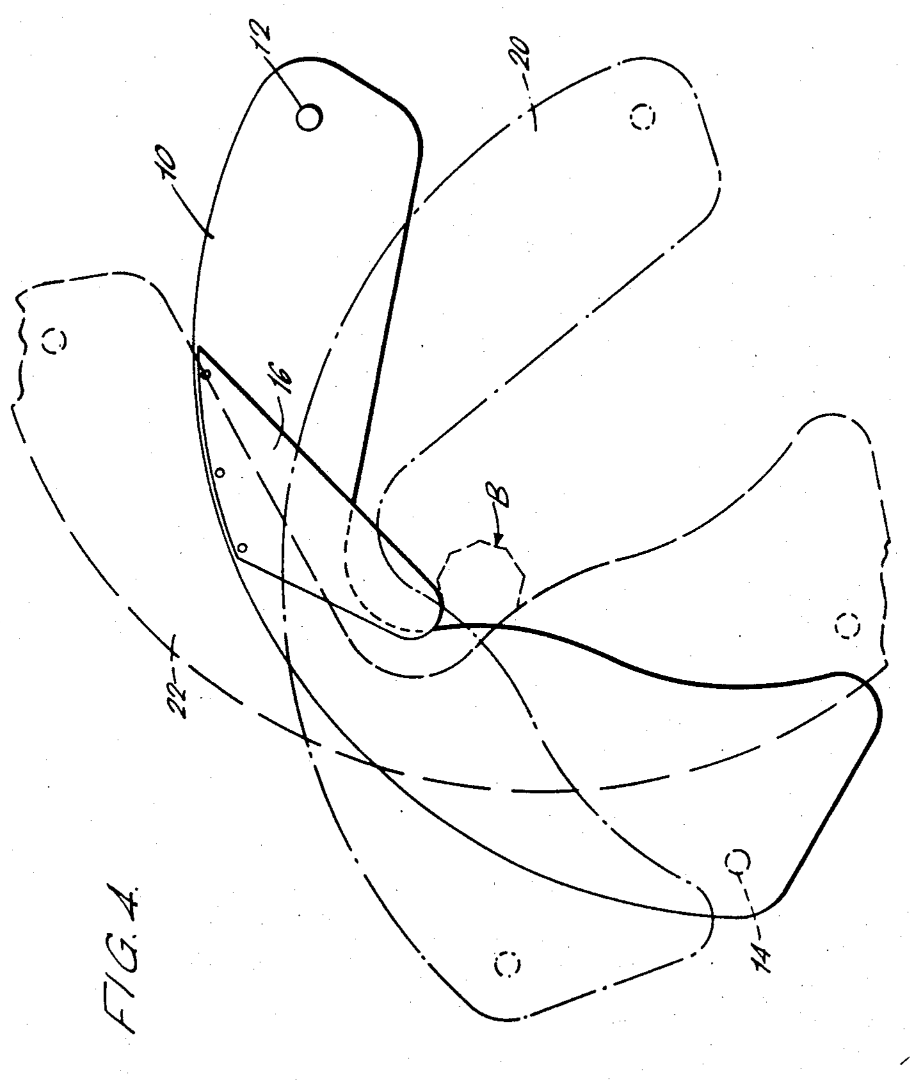

FIG. 4 shows the leaves 10, 20, 22 of FIG. 3 pivotted to a minimum aperture position in which the second curved portion 26 and corresponding portions of the other leaves define an aperture B. At this aperture, the capping section 16 lies just outside the aperture. The position shown in FIG. 4 is the minimum aperture of the diaphragm for normal use and corresponds to the limit of closing of a conventional iris diaphragm.

Figure 5:
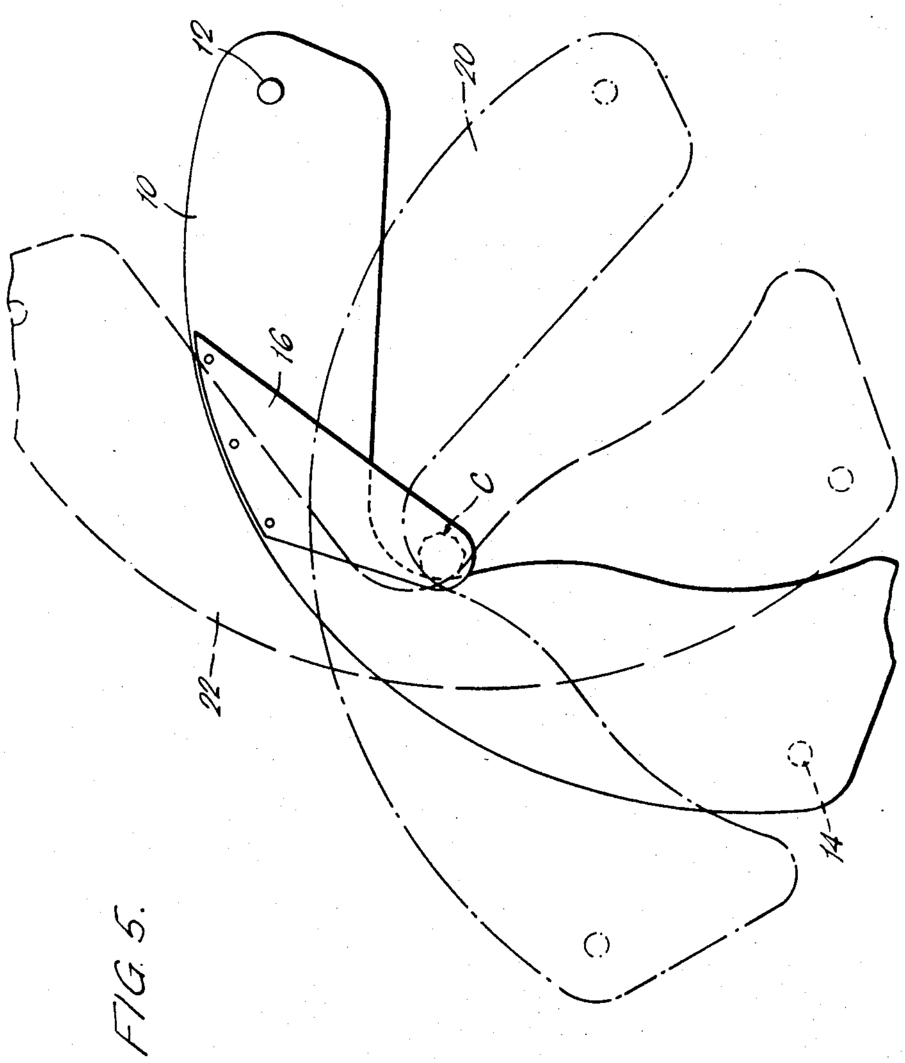
FIG. 5 shows the fully closed position.

According to the invention, however, the leaves 10, 20, 22, etc., can be further pivotted to an inner position as seen in FIG. 5, in which the leaves still define an aperture, indicated as C, and thus avoid the problem of scissoring. The aperture C, however, is obscured by the capping section 16 to render the diaphragm fully closed.

Modifications of this embodiment are of course possible within the scope of the invention. For example, the capping section 16 can be formed integrally with the leaf 10. However, it is preferred to use a separate section of the same thickness as the leaf and secured to the leaf, as in the above embodiment, since this makes the close interleaving of the leaves simpler. It also has the economic advantage of allowing the diaphragm to be constructed from identical leaves.

I claim:

1. An iris diaphragm including a support, a plurality of leaves pivotally mounted on the support and each having its edge nearest the optical path curvilinearly formed in at least a first curve and a second curve, the first curve being an arc of a circle and defining with corresponding first curves of the other leaves the maximum aperture as a circle, and the second curve having an opposite curvature to that of the first curve, means for pivoting the leaves in unison into and out of an optical path between outer and inner positions, and a capping section on one of said leaves adjacent the end of said second curve thereof remote from the first curve thereof and projecting from said edge towards the optical path, the capping section being arranged so that, in the inner aperture - closed position of the leaves, the capping section covers the aperture formed by the leaves.

2. An iris diaphragm according to claim 1, wherein said leaves are disposed in interleaved relationship and the capping section in the aperture-closed position overlaps the leaves immediately around said aperture formed by the leaves to ensure a light-tight closure.

3. An iris diaphragm according to claim 2, wherein said capping section is separately foremd and fixed on to one face of the corresponding leaf so as to project from said edge towards the optical path.

4. An iris diaphragm according to claim 1, wherein the arrangement of said capping section is such and said second curve is so shaped that at intermediate-aperture positions of the leaves the aperture through the diaphragm is completely unobstructed by the capping section until the aperture is very small, and at most considerably less than ¼ the maximum aperture diameter.

5. An iris diaphragm according to claim 4, wherein the aperture is of the order of ⅛ the maximum aperture before obstruction by the capping section commences.

* * * * *